(12) United States Patent
Haug

(10) Patent No.: US 7,482,909 B2
(45) Date of Patent: Jan. 27, 2009

(54) NIGHT VISION DEVICE

(75) Inventor: Karsten Haug, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 11/150,726

(22) Filed: Jun. 9, 2005

(65) Prior Publication Data

US 2006/0022811 A1 Feb. 2, 2006

(30) Foreign Application Priority Data

Jul. 28, 2004 (DE) ........................ 10 2004 036 566

(51) Int. Cl.
*B60Q 1/00* (2006.01)
*H04N 7/00* (2006.01)
(52) U.S. Cl. .................... 340/436; 340/425.5; 340/980; 340/995.24; 340/903; 348/119; 348/148; 348/162; 382/104
(58) Field of Classification Search ................ 340/436; 348/119, 148, 162
See application file for complete search history.

(56) References Cited

U.S. PATENT DOCUMENTS 5,001,558 A * 3/1991 Burley et al. ................ 348/164
2004/0066376 A1* 4/2004 Donath et al. ............... 345/169

FOREIGN PATENT DOCUMENTS

| DE | 199 40 723 | 3/2001 |
| DE | 101 31 720 | 1/2003 |
| EP | 0 686 865 | 11/1998 |
| EP | 1 327 969 | 7/2003 |
| EP | 1 407 931 | 4/2004 |
| WO | WO 02/36389 | 5/2002 |
| WO | 2003/005102 | 1/2003 |

* cited by examiner

*Primary Examiner*—Donnie L Crosland
(74) *Attorney, Agent, or Firm*—Kenyon & Kenyon LLP

(57) ABSTRACT

In a night vision device for motor vehicles having at least one night vision camera, a control unit and a display unit for displaying a night vision image, the control unit is designed to ascertain and display assister markings for longitudinal and/or lateral guidance while driving the motor vehicle.

12 Claims, 3 Drawing Sheets

NIGHT VISION DEVICE

FIELD OF THE INVENTION

The present invention relates to a night vision device for motor vehicles having at least one night vision camera, one control unit and one display unit for displaying a night vision image.

BACKGROUND INFORMATION

Night vision devices for motor vehicles are described, for example, in PCT Patent Publication No. WO 02/36389. They have night vision cameras, which, for example, on the basis of near infrared with active illumination (NIR) or on the basis of head radiation (FIR) take a picture of the surroundings of the vehicle with a visual range that normally exceeds the visual range of the human eye. The image of the surroundings of the vehicle is displayed to the driver via a display unit. The display unit may be a conventional display in a dashboard or a head-up display, which projects the image onto the windshield with the aid of a projector. Head-up projectors are described, for example, in German Patent Application No. DE 101 31 720.

Driving according to a display with the aid of the pure night vision image is relatively difficult since it is hard to estimate relative positions in the traffic lane by the displayed night vision image. Even on very well-constructed roads such as highways and superhighways, which have very good lane markings and large radii of curvature, driving according to a display of the night vision image is possible only with difficulty. In addition, the distance to other objects, particularly to preceding vehicles, is very hard to estimate. Even with great practice of driving according to a displayed night vision image, maintaining a suitable safety distance is possible only with difficulty since the night vision image was often shot using a different aperture angle than the picture perceived by the human eye through the windshield.

From German Patent Application No. DE 199 40 723, a method for displaying a perspective image is known, in which image elements are changed in at least one variable as a function of the travel path ahead, of at least one operating parameter of the vehicle and/or of at least one parameter of an object identified in the region of the travel path.

SUMMARY OF THE INVENTION

An objective of the present invention is to provide an improved night vision device, which facilitates the guidance of a motor vehicle while observing the displayed night vision image.

According to the present invention, the objective is achieved in that the control unit is designed to ascertain and display assister markings for longitudinal and/or lateral guidance when driving the motor vehicle.

The assister markings inserted or permanently attached to the display unit provide in a simple manner a substantial assistance in the longitudinal and/or lateral guidance of the motor vehicle. The assister markings are preferably assister lines.

For lateral guidance, preferably at least one assister marking for representing the lane center or lane limits of a traffic lane and at least one assister marking for representing the vehicle center or the vehicle width are ascertained and displayed on the night vision image. The at least one assister marking for representing the vehicle center or vehicle width may either be currently calculated or definitely specified, i.e. ascertained only once, since the camera coordinates have fixed relations with respect to the vehicle coordinates.

The assister marking for representing the lane center or the lane limits of a traffic lane may be determined in a simple manner from the night vision image using known image analysis methods. The driver then only needs to guide the vehicle according to the assister markings such that the assister markings of the lane center and vehicle center or the assister markings for the vehicle position and the lane markings are made to coincide symmetrically.

The at least one assister marking is preferably ascertained as a function of the angle and of the lateral offset between the sensor axis of the night vision image sensor and the longitudinal axis of the motor vehicle. This angle and this offset determine the perspective of the night vision image and the position relative to the vehicle center or the vehicle limits.

It is especially advantageous if the control unit is designed for calculating the current position of the vehicle in a traffic lane from the night vision image and for comparing to a setpoint position for ascertaining and displaying a correction vector. The correction vector already implies a comparison, otherwise to be conducted by the driver, between the actual and the setpoint position and is very easy for the driver to apprehend.

For longitudinal guidance it is advantageous if, in the vertical direction of the display, distance assister lines having definitively specified distances are statically displayed from the motor vehicle forward in the direction of travel. This may occur for example by permanently attached markings on the display unit or by a static insertion of the distance assister lines superimposed with respect to the night vision image.

It is especially advantageous, however, if the control unit is designed to ascertain and display a setpoint distance with respect to a preceding vehicle as a function of the vehicle's own velocity.

The control unit may additionally be connected to surround sensors for ascertaining parameters of the weather situation and/or of the road condition and be designed to ascertain the setpoint distance as a function of the ascertained parameters.

In this manner it is possible to ascertain and display a current setpoint distance while taking the relevant driving situation into consideration.

It is furthermore advantageous if the control unit is connected to a navigation device and is designed to ascertain the assister markings as a function of parameters provided by the navigation device. Such parameters may be, for example, the course of the road such that the setpoint distance is increased in the case of a curvaceous route.

The control unit may preferably be connected to an anti-collision device, at least one collision object provided by the anti-collision device in three-dimensional relative coordinates being projected into the two-dimensional night vision image.

The combination having an anti-collision device has the advantage that the driver is able to understand how the longitudinal regulation of the anti-collision device corrects the actual position in the direction of the setpoint position by braking or accelerating the motor vehicle. In a corresponding manner, a combination of the night vision device and a lane tracking device may be provided as well, which is preferably based on the same image information of the image sensor and the same lane detection algorithm as it is used by the night vision device. The driver is thereby visually shown the quality of the lane detection as well as the lateral regulation process.

DESCRIPTION DESCRIPTION

Figure 1:
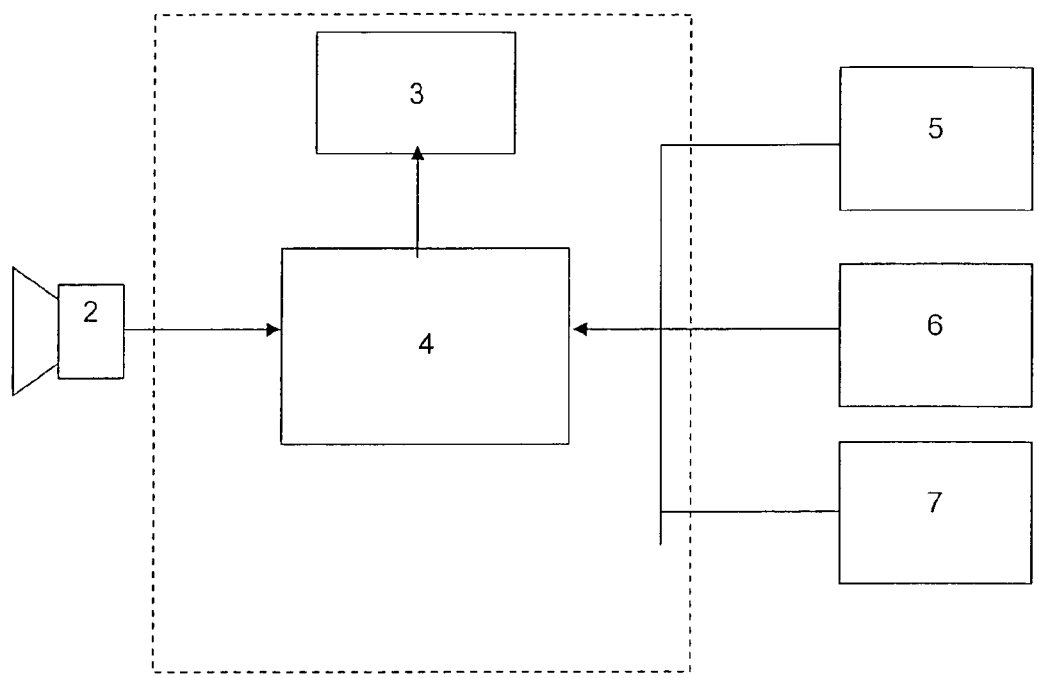
FIG. 1 shows a block diagram of a night vision device for motor vehicles.

FIG. 1 reveals a block diagram of a night vision device 1, which essentially has a night vision camera 2, a display unit 3 for a night vision image as well as a control unit 4. The night vision camera may function on the basis of near infrared with active illumination (NIR) or on the basis of heat radiation (FIR). Control unit 4 is preferably programmable and has a microprocessor and/or an FPGA (field programmable gate array) or ASIC (application specific integrated circuit).

Display unit 3 may be a conventional display or a head-up projector or the like.

Guiding a motor vehicle according to the night vision image represented in display unit 3 is problematic since the relative position of the motor vehicle in the traffic lane as well as the distance with respect to other objects can be estimated only with difficulty. This is due to the fact that night vision device 1 was often shot using a different aperture angle and/or different shooting positions than the actual picture of the surroundings registered by the driver through the windshield and that peripheral vision is insufficient due to small horizontal aperture angles. In addition, the night vision images are possibly even enlarged or reduced.

In order now to improve the guidance of a motor vehicle on the basis of the displayed night vision image, control unit 4 for example is designed by suitable programming to ascertain and display assister markings, particularly assister lines, for longitudinal and/or lateral guidance. This allows the driver to guide the motor vehicle in dependence on the assister lines, for example by correcting the vehicle position towards the right and left by the steering wheel angle and by braking or accelerating for adjusting the distance.

Optionally, control unit 4 is connected to a navigation device 5 for relaying additional parameters, such as for example the further course of the road, to night vision device 1 for evaluation and display.

Furthermore, control unit 4 may be optionally connected to an anti-collision device 6, particularly in order to transmit collision objects provided by anti-collision device 6 to night vision device 1 for evaluation and display.

Optionally, control unit 4 may be furthermore connected to a lane tracking device 7 in order to relay lateral regulation parameters and lane information of lane tracking device 7 to night vision device 1 for evaluation and display.

Control unit 4 may furthermore be designed for evaluating additional parameters provided by surround sensors either via the mentioned navigation devices 5, anti-collision devices 6 or lane tracking devices 7 or separately. These parameters are then displayed and, if required, used for ascertaining the assister markings for the longitudinal and/or lateral guidance of the motor vehicle.

Figure 2:
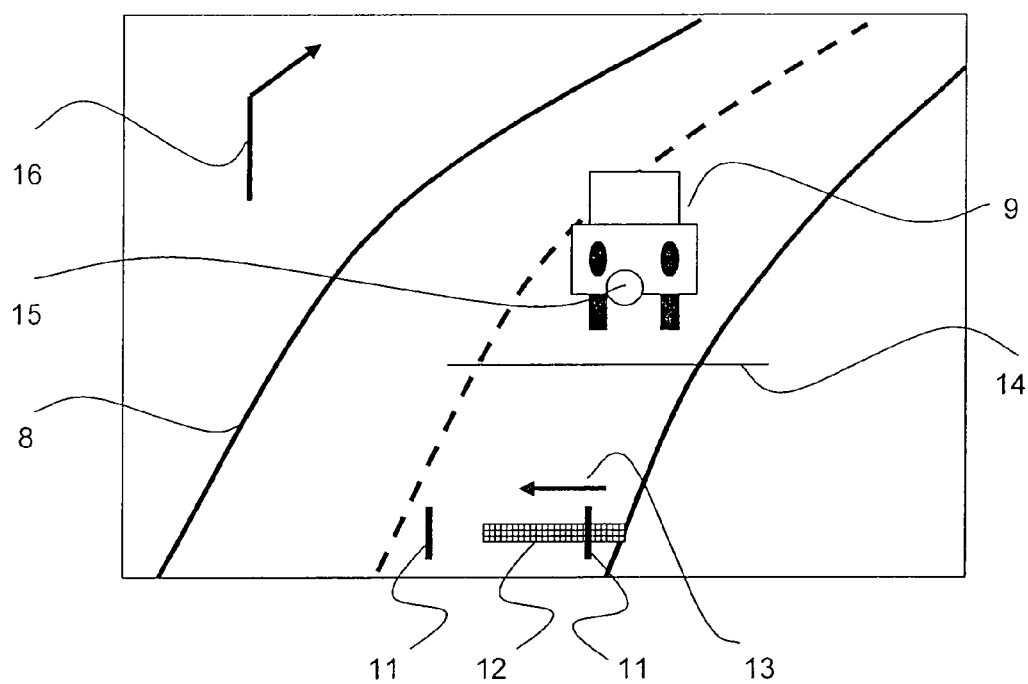
FIG. 2 shows a sketch of a night vision image having inserted assister markings.

FIG. 2 shows a sketch of an exemplary night vision image having several assister markings. The night vision image shows a curved course of the road 8, at least one preceding vehicle 9.

For lateral guidance, control unit 4 displays assister markings 11 for representing the lane center or the lane limits of the traffic lane (setpoint lateral position) as well as a bar-shaped assister marking 12 for displaying the ACTUAL lateral position of the vehicle or the vehicle center or vehicle width. An arrow-shaped correction vector 13 above this assister marking 11, 12 indicates that a correction of the vehicle position to the left is required.

Furthermore, a horizontal assister line 14 is inserted, which reveals the minimum safety distance with respect to preceding vehicle 9. This assister line 14 is determined by control unit 4 as a function of the motor vehicle's own velocity and possibly by additional parameters such as the weather situation, visibility etc.

The actual distance of the motor vehicle from a preceding object is shown clearly by a point marking 15, which was calculated by the anti-collision device by projection from the 3D object position. Furthermore, an arrow marking 16, for example a bent arrow, is provided for representing the further course of the road. This arrow marking 16 can be determined from the night vision image. Preferably, however, the arrow marking is calculated on the basis of information regarding the course of the road provided by a navigation device 5 since in this manner it is possible to provide lane courses even if the visibility of the night vision device is limited (e.g. in front of crests), or which exceed the visual range of the night vision device.

Figure 3:
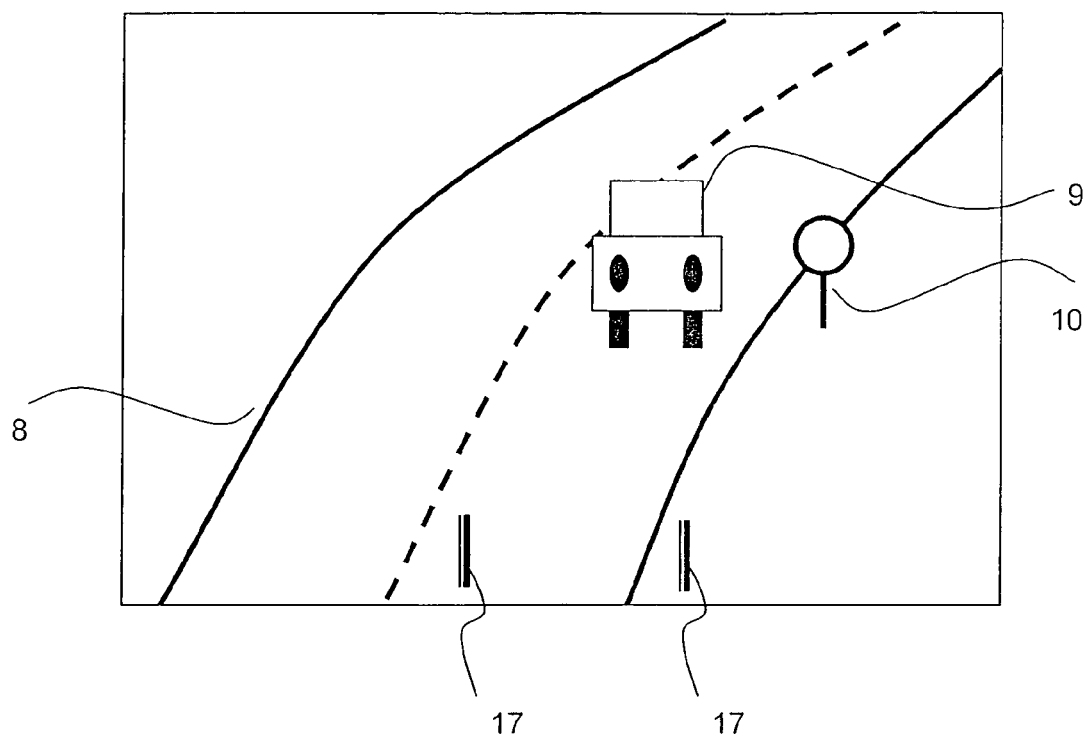
FIG. 3 shows a sketch of a night vision image having inserted assister lines for lateral guidance.

FIG. 3 shows the exemplary night vision image from FIG. 2 having simplified assister markings 17 for lateral guidance. Assister markings 17 are two markers permanently inserted in display unit 3 or attached to display unit 3, which assist the driver in lateral guidance. In guiding the motor vehicle, these fixed static assister markings 17 must be made to coincide or to be symmetrical with respect to the boundary markings of the traffic lane visible in the night vision image. The distance between assister markings 17 is chosen so as to correspond to the average lane width. This can be adjusted on the basis of the navigation device (e.g. to typical road types: superhighway, highway, city). The position of assister markings 17 is chosen in such a way that the vehicle is located precisely at the center of the lane if assister markings 17 match the markings of a normal traffic lane 8 or lie symmetrically between these or symmetrically around these. The position of assister markings 17 is determined from the relative positions and relative axis of night vision camera 2, the vehicle and the lane width.

FIG. 3 reveals that the vehicle is clearly situated too far to the right. On the basis of the information in the night vision image, the driver is now able to correct the lateral direction of the vehicle accordingly by steering. This is true even if the lane width of traffic lane 8 varies. In that case, a correction of the vehicle position occurs in such a way that assister markings 17 on the left and on the right are equidistant from the lane markings or lie symmetrically between these or symmetrically around these. The position of assister markings 17 are determined from the relative position and the relative axis of camera and vehicle.

The calculation of assister marking 17 is based on the fixed correlation between the shooting axis of night vision camera 2 and the longitudinal axis of the motor vehicle such that the positions of assister markings 17 have to be ascertained only once in the calibration of night vision camera 2 with respect to the motor vehicle.

Figure 4:
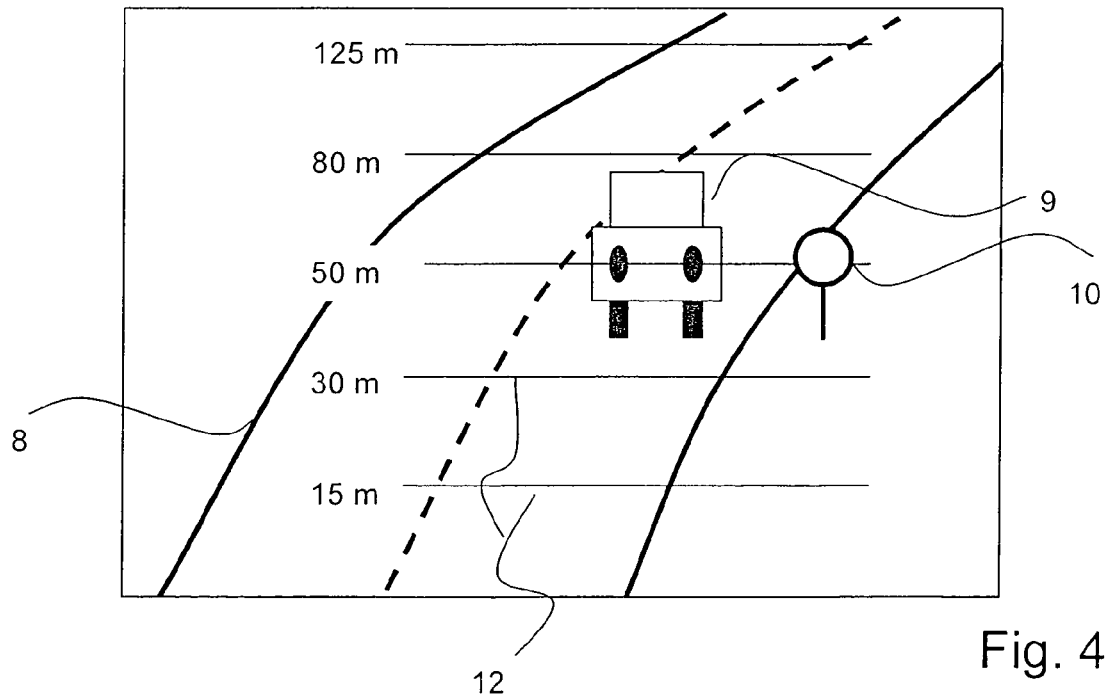
FIG. 4 shows a sketch of a night vision image having inserted horizontal assister lines for representing distance.

FIG. 4 shows the exemplary night vision image from FIG. 2 having assister markings 18 for longitudinal guidance. Assister markings 18 are static distance assister lines for the longitudinal guidance of the vehicle, which are inserted into the night vision image along with their distance to the driver's own motor vehicle or are permanently attached to display unit 3. With the aid of these distance assister lines 18, the driver himself is then able to regulate the distance to preceding vehicles for example according to the rule "distance is equal to half of the speedometer reading".

The calculation of the position of distance assister lines 18 on display unit 3 occurs on the basis of a simple projection on the assumption of a flat roadway without vertical curvature.

The curvature of the roadway, for example, may be taken into consideration by information from navigation device 5 or other three-dimensional information such as, for example, a stereo camera.

Figure 5:
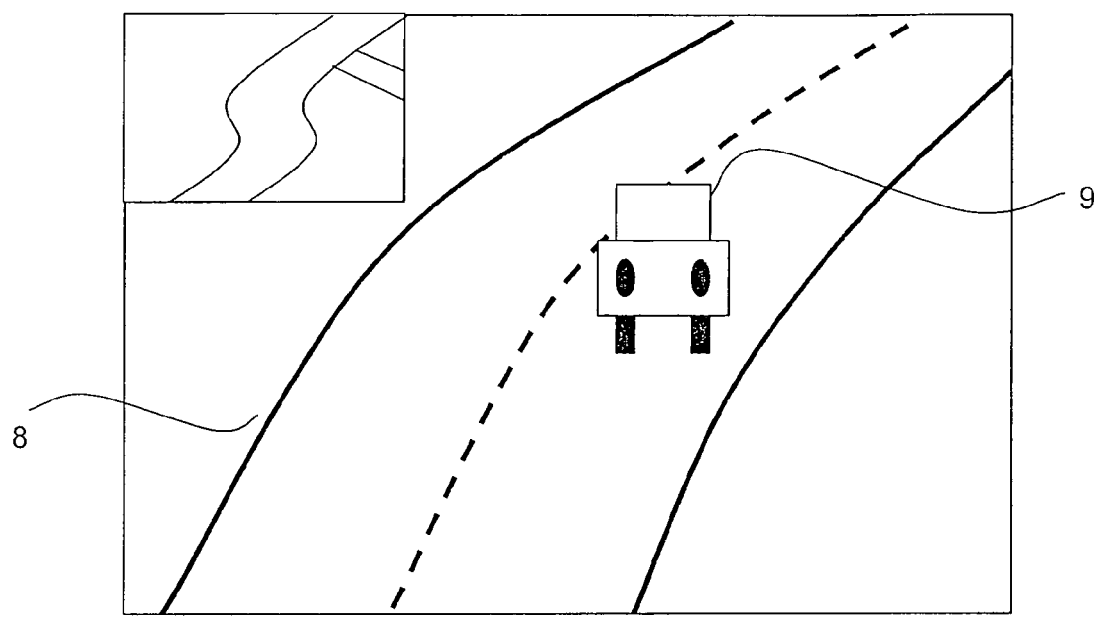
FIG. 5 shows a sketch of a night vision image having an inserted map detail, which is provided by a navigation device for representing the further course of the road.

FIG. 5 shows a sketch of an exemplary night vision image having a map detail inserted on the upper left. The data of the map detail are provided by a navigation device which is connectable to night vision device 1. With the aid of the map detail, the driver is shown the further course of the road particularly beyond the visual range of navigation device 1.

What is claimed is:

1. A night vision device for a motor vehicle comprising:
   at least one night vision camera;
   at least one display unit for displaying a night vision image of an area in the proximity of the motor vehicle as captured by the at least one night vision camera; and
   at least one control unit for ascertaining and displaying at least one assister marking for at least one of longitudinal and lateral guidance in driving the motor vehicle, wherein the at least one assister marking is an addition to the night vision image captured by the at least one night vision camera and is superimposed on the night vision image captured by the at least one night vision camera and displayed on the display unit, and wherein the at least one assister marking includes at least one icon representing the actual lateral position of the motor vehicle relative to lane boundaries of a traffic lane on the night vision image.

2. The night vision device according to claim 1, wherein the display unit statically represents vertical distance assister lines having definitively specified distances from the motor vehicle forward in a direction of travel.

3. The night vision device according to claim 1, wherein the control unit ascertains and represents a setpoint distance with respect to a preceding vehicle as a function of the vehicle's own velocity.

4. The night vision device according to claim 3, wherein the control unit is connected to surround sensors for ascertaining parameters of at least one of (a) a weather situation and (b) a road condition and ascertains the setpoint distance as a function of the ascertained parameters.

5. The night vision device according to claim 1, wherein the control unit is connected to a navigation device and ascertains the at least one assister marking as a function of parameters provided by the navigation device.

6. The night vision device according to claim 1, wherein the control unit is connected to an anti-collision device and projects at least one collision object provided by the anti-collision device in three-dimensional relative coordinates into a two-dimensional night vision image.

7. The night vision device according to claim 1, wherein the control unit is connected to a lane tracking system.

8. The night vision device according to claim 1, wherein the control unit is connected to a navigation device and inserts a further course of a road provided by the navigation device.

9. A night vision device for a motor vehicle comprising:
   at least one night vision camera;
   at least one display unit for displaying a night vision image of an area in the proximity of the motor vehicle as captured by the at least one night vision camera; and
   at least one control unit for ascertaining and displaying at least one assister marking for at least one of longitudinal and lateral guidance in driving the motor vehicle, wherein the at least one assister marking is an addition to the night vision image captured by the at least one night vision camera and is superimposed on the night vision image captured by the at least one night vision camera and displayed on the display unit, and wherein the at least one assister marking indicates the actual lateral position of the motor vehicle relative to lane boundaries of a traffic lane on the night vision image, wherein the at least one assister marking includes a first icon representing the actual lateral position of the motor vehicle and a second icon representing at least one of (a) a lane center and (b) lane limits of the traffic lane on the night vision image.

10. The night vision device according to claim 9, wherein the at least one assister marking is ascertained from an angle and a last offset between a sensor axis of the night vision camera and a longitudinal axis of the motor vehicle.

11. A night vision device for a motor vehicle comprising:
    at least one night vision camera;
    at least one display unit for displaying a night vision image of an area in the proximity of the motor vehicle as captured by the at least one night vision camera; and
    at least one control unit for ascertaining and displaying at least one assister marking for at least one of longitudinal and lateral guidance in driving the motor vehicle, wherein the at least one assister marking is an addition to the night vision image captured by the at least one night vision camera and is superimposed on the night vision image captured by the at least one night vision camera and displayed on the display unit, and wherein the at least one assister marking indicates the actual lateral position of the motor vehicle relative to lane boundaries of a traffic lane on the night vision image, wherein the at least one assister marking is an icon representing at least one of (c) a vehicle center and (d) a vehicle width relative to the traffic lane on the night vision image, and wherein the at least one assister marking is superimposed on the night vision image.

12. A night vision device for a motor vehicle comprising:
    at least one night vision camera;
    at least one display unit for displaying a night vision image of an area in the proximity of the motor vehicle as captured by the at least one night vision camera; and
    at least one control unit for ascertaining and displaying at least one assister marking for at least one of longitudinal and lateral guidance in driving the motor vehicle, wherein the at least one assister marking is an addition to the night vision image captured by the at least one night vision camera and is superimposed on the night vision image captured by the at least one night vision camera and displayed on the display unit, and wherein the at least one assister marking indicates the actual lateral position of the motor vehicle relative to lane boundaries of a traffic lane on the night vision image, wherein the control unit calculates a current position of the vehicle in a traffic lane from the night vision image and compares to a setpoint position for ascertaining and displaying a correction vector.

* * * * *